Aug. 6, 1957     W. E. ENGELER     2,802,160
INTERMEDIATE ZONE LOCATING SERVOSYSTEM
Filed Nov. 9, 1954
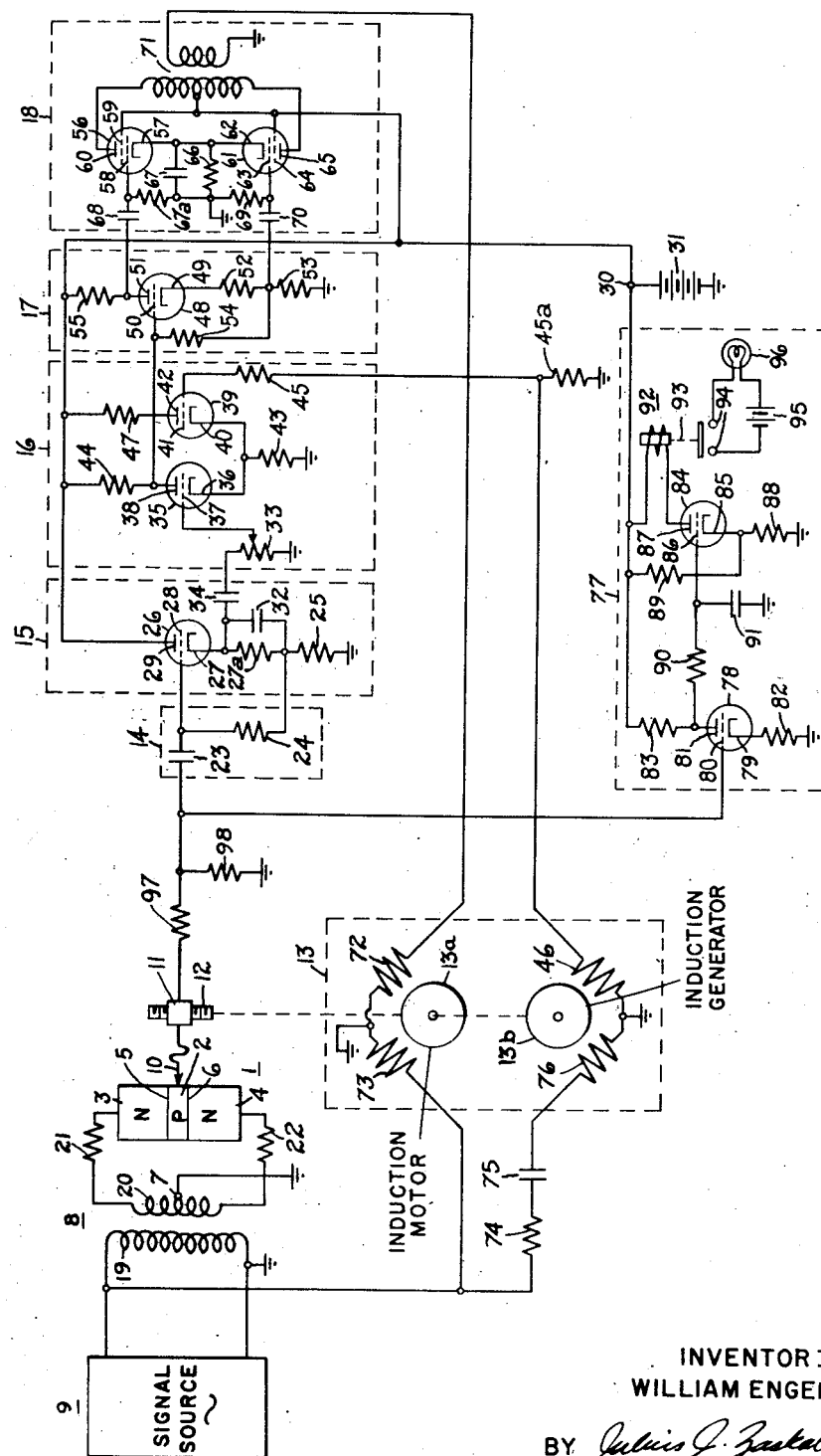
INVENTOR:
WILLIAM ENGELER,
BY *Julius J. Zatalicky*
HIS ATTORNEY.

United States Patent Office 2,802,160
Patented Aug. 6, 1957

2,802,160

INTERMEDIATE ZONE LOCATING SERVOSYSTEM

William E. Engeler, Syracuse, N. Y., assignor to General Electric Company, a corporation of New York Application November 9, 1954, Serial No. 467,835

5 Claims. (Cl. 318—29)

The present invention relates to locating systems and more particularly to such systems utilized in conjunction with semiconductor devices such as disclosed in a copending aplication of R. N. Hall, Jr., Serial Number 304,203, filed August 13, 1952, and assigned to the assignee of the present invention, now abandoned.

A device of the type disclosed in the above identified application includes in general a body of semiconducting material such as germanium or silicon having a zone of one conductivity type, either N or P, located or sandwiched between two zones of the opposite type conductivity and electrical connections to the three zones. In accordance with recognized nomenclature, the intermediate zone is termed the base and the outer zones are termed the emitter and collector. In one mode of operation as an amplifier, signals are impressed between the emitter and the base and amplified signals are obtained in a load circuit connected between the collector and base.

The performance characteristic of such semiconductor devices are dependent upon, among other things, the physical parameters of the intermediate or base zone. For example, in a case of devices operated as amplifiers, the upper frequency limit for efficient operation is dependent upon the thickness of this zone, the limit becoming higher as the thickness of the zone decreases. Accordingly, for this and other applications, it is very desirable that the intermediate zone be extremely thin. In devices of this character the intermediate zone is usually of the order of a thousandth of an inch or less thick. The construction of such devices having a thin base zone involves a practical problem of locating this zone in order to make an electrical connection thereto to form an operable device. The present invention is addressed to the provision of a means for locating such thin zones.

It is a general object of the present invention to provide method and apparatus for locating an extremely thin region, such as the base region of certain semiconductor devices.

It is another object of the present invention to provide apparatus for automatically indicating the location in a semiconductor device of a thin region of one-type conductivity situated adjacent a region of the opposite conductivity type.

It is also an object of the present invention to provide improvements in locating and indicating systems.

In carrying out the present invention in one form as applied to apparatus for locating the thin zone of such devices there is provided a conductive probe in sliding contact with the surface of said device. Means are also provided for applying an alternating voltage in one phase between a point of predetermined potential and one of said zones of opposite conductivity type and in another phase between said point and the other of said zones of opposite conductivity type, whereby when said probe is in contact with said one zone, a voltage of said one phase is derived between said point and said probe and when said probe is in contact with said other zone, a voltage of said other phase is derived between said point and said probe. And further, when said probe is in contact with said one zone of said one conductivity type, a voltage of another frequency is derived between said point and said probe. Additionally, motive means responsive to said derived voltage of one phase is provided for moving said probe in one direction toward said one zone of one conductivity type and responsive to said derived voltage of said other phase for moving said probe in another direction toward said one zone of one conductivity type and non-responsive to voltages of other frequencies.

The features of this invention which are believed to be novel are set forth with particularity in the appended claims. The invention itself, however, both as to its organization and method of operation together with further objects and advantages thereof may best be understood by reference to the following description taken in connection with the accompanying drawing wherein is shown a schematic diagram of apparatus embodying the present invention.

Referring now to the drawing there is shown a semiconductor device 1 comprising a bar of semiconductor material having a thin base zone 2 of one type conductivity located or sandwiched between two end zones 3 and 4 of opposite conductivity type. The zones meet at two P–N junctions 5 and 6, respectively extending inwardly from and perpendicular to the faces of the device 1. As shown, the base 2 is P-type material and the zones 5 and 6 are N-type material. As is well known, the P–N junction acts as a rectifier. When a junction is biased in the forward direction, that is, when the P-type material one one side of the junction is biased positive with respect to the N-type material on the other side of the junction, substantial current flows across the junction from the P-type material to the N-type material. However, when the P-type material is biased in the reverse direction, that is, when the P-type material is biased negatively with respect to the N-type material, substantially no current flows through the junction. Thus, the device 1 includes two P–N junctions 5 and 6 which function as rectifying diodes with the P-region 2 acting as one terminal for both junctions.

A voltage of one phase is applied between a predetermined potential point 7 here shown as ground and one of the regions of N-type conductivity and a voltage of the same frequency but opposite phase is applied between predetermined potential point 7 and the other zone of N-type conductivity by means of the transformer 8 which is connected to a source of alternating voltage 9.

A conductive probe 10 in sliding and conductive contact with said device is provided. The probe 10 is mechanically connected to a carriage 11 which is moved along the axis of a screw 12 as the latter is turned by an induction motor thereby causing the probe to move along a side of the device 1 from one type region to another. The induction machine 13 includes two separate stators, each stator including a pair of windings in space quadrature and including respective squirrel cage type rotors, the latter being on the same shaft and mechanically linked with the screw 12.

When the probe is in contact with the N-type region 3 a voltage of one phase is derived between the probe 10 and the point 7. When the probe 10 is in contact with the other region of N-type conductivity 4, a voltage of the opposite phase is developed between the probe 10 and the point 7. When the probe is in contact with the P-region 2, a full wave rectified voltage is obtained between the probe 10 and the point 7. This full wave rectified voltage includes a unidirectional component of voltage and an alternating component of twice the frequency of the source 9.

The voltage appearing between the probe 10 and the point 7 is applied through a phase shift amplifying channel comprising the phase shift network 14, impedance isolation stage 15, the combining amplifier 16, the phase inverter and driver 17, and the power output amplifier 18 to motor 13. The output from the phase shift amplifying channel being shifted in phase substantially by 90 degrees by the phase shift network 14 with respect to the voltage appearing across the secondary of the transformer 8 is applied to one winding 72 of a pair of stator windings of motor portion of machine 13, to the other winding 73 of which is applied a voltage from source 9. Since the voltages applied to the quadrature spaced windings of the induction motor are in quadrature time phase, a rotating field is developed and by induction motor action the rotor 13a is caused to turn thereby moving the carriage 11.

The space quadrature windings of the motor portion of induction machine 13 are poled so that the quadrature voltages applied to these windings move the carriage 11 toward the P-type region 2. When the probe 10 is contacting the N-type region 4, a voltage of one phase is developed between the point 10 and ground, consequently, the motor is caused to rotate in a direction to move the probe 10 to the P-type region 2. When the probe 10 is in contact with the N-type region 5, a voltage of the opposite phase is developed between probe 10 and ground, consequently, the motor portion of induction machine 13 is caused to rotate in an opposite direction to again move probe 10 to the region 2. When the probe is in contact with the P-type region 2 as noted above, a voltage of twice the applied frequency is developed between the probe and ground. Since the induction motor under these conditions has a voltage of one frequency applied to one of its quadrature stator windings and a voltage of another frequency applied to the other of its quadrature stator windings, no rotating field is developed, and consequently, the rotor remains stationary.

In order to insure the accurate location of the P-type region, it is essential to stop the probe 10 once it reaches the P-type region. To insure this action a voltage substantially 180 degrees out of phase with respect to the voltage being applied to motor portion of induction machine 13 from probe 10 is continuously applied to motor portion of induction machine 13 through the phase shift amplifying channel from the feedback winding 46 of the induction machine 13. This voltage is of lesser amplitude than the driving voltage applied to motor 13 and consequently does not interfere with the normal driving of motor 13. However, when the driving voltage disappears, the feedback voltage tends to drive the induction motor 13 in the reverse direction. Since this voltage is a function of the speed of the rotor 13a of the motor portion of induction machine 13, it does not drive the probe 10 in the reverse direction but does cause a very sudden stopping of the rotor.

Referring now to circuit elements of the drawing in greater detail, source 9 is any source of alternating voltage which may, for example, be a 60 cycle source. The transformer 8 includes a primary winding 19 having one terminal connected to ground and to one terminal of the source 9 and the other end thereof connected to another terminal of the source 9. The secondary winding 2 of the transformer 8 has one end connected through a current limiting resistance 21 to region 3 of the device 1 and the other end thereof connected through current limiting resistance 22 to the region 4 of the device 1. The center tap 7 of the secondary is connected to ground. Resistances 97 and 98 are connected between probe 10 and ground. The phase shift network 14 including a capacitance 23 in series with a resistance 24 is connected in that order between the junction of resistances 97 and 98 and ground through cathode load resistance 25. The capacitance 23 is such that its reactance at the frequency of the source 9 is considerably greater than the resistance of resistance 24 in order that the current flowing in resistance 24 and consequently the voltage thereacross is advanced 90 degrees in phase with respect to the voltage applied to this phase shift network. The resistances 97 and 98 provide high impedance in the probe circuit to avoid drawing current through the device 1. The output across the resistance 24 is applied to the impedance isolation stage 15 which comprises electron discharge device 26 including a cathode 27, a grid 28, and an anode 29, the cathode 27 being connected through cathode bias impedance 27a bypassed by capacitance 32 to one end of cathode load resistance 25, the other end of which is connected to ground. The grid 28 is connected to the junction of capacitance 23 and resistance 24. The anode 29 is connected to the positive terminal 30 of a source 31 of unidirectional potential, the other terminal of which is connected to ground. The output appearing at the cathode 27 is applied through capacitance 34 across potentiometer 33.

The combining amplifier 16 includes electron discharge device 35 including a cathode 36, a grid 37, and an anode 38, and an electron discharge device 39 including a cathode 40, a grid 41, and an anode 42. Cathodes 36 and 40 are connected to one end of cathode resistance 43, the other end of which is connected to ground. The grid 37 is connected to the slidable tap of potentiometer 33. The anode 38 is connected through anode load resistance 44 to the positive terminal 30. The grid 41 is connected through grid leak resistances 45 and 45a to ground. The junction of resistances 45 and 45a is connected to one end of the feedback winding 46 of the generator portion of induction machine 13, the other end of which is connected to ground. The anode 42 is connected through anode load resistance 47 to the positive terminal 30. The output from the anode 38 is applied to the phase inverter driver stage 17 comprising electron discharge device 48 including a cathode 49, a grid 50, and an anode 51, the cathode 49 being connected through cathode resistances 52 and 53 to ground, grid 50 being connected through grid leak resistance 54 to the junction of resistances 52 and 53, the anode 51 being connected through anode load resistance 55 to the positive terminal 30. The grid 50 also being connected to the anode 38.

The power amplifier 18 comprises electron discharge device 56 including a cathode 57, a grid 58, a screen grid 59, and an anode 60, and electron discharge device 61 including a cathode 62, a grid 63, a screen grid 64, and an anode 65. The cathodes 62 and 57 are connected together and through cathode biasing resistance 66 bypassed by bypass capacitor 67 to ground. Grid 58 is connected through grid leak resistance 67a to ground and also through coupling capacitor 68 to anode 51. Grid 63 is connected through grid leak resistance 69 to ground and also through coupling capacitor 70 to the junction of resistances 52 and 53. The screen grids 59 and 64 are connected together and to the center tap of the primary winding of transformer 71 and to positive terminal 30. One end of the primary of transformer 71 is connected to anode 60, the other end is connected to anode 65. The secondary winding of transformer 71 has one end connected to ground and the other end thereof connected to one end of the control winding 72, the other end of which is connected to ground. The winding 73 of the induction motor 9 has one end connected to ground and the other end thereof connected to the ungrounded terminal of source 9. The ungrounded terminal of source 9 is also connected through phase shift resistance 74 and capacitance 75 to one end of exciter winding 76 of induction generator portion of induction machine 13, the other end of which is connected to ground.

The induction machine 13 comprises an induction motor portion and an induction generator portion. As pointed out above, the induction motor portion includes a pair of stator windings 72 and 73 wound in space quadrature one with respect to the other. The rotor is of the usual squirrel cage type, consequently, when an alternating voltage is applied to both windings, the voltage applied to winding 72 being in time quadrature with respect to the voltage applied to 73, a rotating field is produced which causes the squirrel cage rotor to move in substantial accordance with the motion of the rotating field. The induction generator portion also includes a pair of windings, one winding 46 being wound on the stator of the machine in space quadrature with respect to the other winding 76. The rotor is also the usual squirrel cage type. The rotors of the induction motor portion and the induction generator portion are mechanically interlinked and connected to the screw 12 which drives the carriage 11. Since the winding 46 is in space quadrature with respect to the winding 76, the application of a voltage to the winding 76 produces no output in the winding 46. However, when the rotor 13b of the induction generator portion is rotated, a voltage is developed in the rotor winding which produces a magnetic flux which links the winding 46. In accordance with well known principles, this flux produces a voltage in the winding 46 which is substantially 90 degrees out of phase with respect to the voltage applied to the winding 76. To obtain the desired feedback action described above, it is pointed out that the voltage developed across the winding 46 and which is applied to the combining amplifier should be substantially 180 degrees out of phase with respect to the voltage applied to the amplifier 16 from the probe 10. Since the phase shift network 14 produced substantially 90 degrees phase shift in the voltage obtained from the probe 10, a similar phase shift is introduced by the R–C network 74–75 in order to obtain the 180 degree desired phase relationship between the signal from probe 10 and the feedback winding 46.

The indicator circuit 77 functions to develop an indication when the probe 10 is contacting the P-region 2. This indicator circuit comprises an electron discharge device 78 including a cathode 79, a grid 80, and anode 81. The cathode 79 is connected to ground through cathode resistance 82. The grid 80 is connected to the junction of resistances 97 and 98 and the anode 81 is connected through anode load resistance 83 to positive terminal 30. The indicator circuit 77 also includes an electron discharge device 84 including a cathode 85, a grid 86, and an anode 87. The cathode is connected through cathode load resistance 88 to ground and also through a biasing resistance 89 to the positive terminal 30. The grid is connected through filter resistance 90 to anode 81 and also through filter capacitance 91 to ground. The anode 87 is connected through the solenoid of relay 92 to the positive terminal 30. The solenoid 92 is provided with an armature 93 which engages a pair of normally open contacts 94 in circuit with a source of voltage 95 and a lamp 96. The device 84 is normally biased nonconductive due to the high positive potential on the cathode 85. The presence of an alternating signal on the grid 80 from the probe 10 does not affect the average bias on the grid 86 consequently, has no effect on the operation of the solenoid. However, when the probe contacts the P-type region, rectification is produced and a voltage is developed at the probe which has a negative polarity. This voltage drives the tube 78 nonconductive thereby raising the potential of anode 81 consequently, the grid 86 thereby rendering the device 84 conductive. Relay 92 is actuated with the resultant production of an indication on the lamp 96.

Utilizing a 60 cycle source and an induction machine of the type manufactured by Kollsman Company and designated Kollsman control Motor Type No. 1182–016600 very satisfactory operation was had. Base regions of the order of one-thousandth of an inch wide were located with ease and accuracy.

While the invention has been illustrated in connection with an N–P–N type transistor, the invention is equally applicable to P–N–P type transistors and to other semiconductor devices.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In combination, a body of semiconductor material having a region of one type conductivity bordering on each of two sides thereof by a region of opposite type conductivity to form a pair of P–N junctions, a probe in sliding contact with the surface of said regions, means for applying an alternating voltage in one phase between a point of predetermined potential and one of said regions of opposite conductivity type and in another phase between said point and the other of said regions of opposite conductivity type, means for deriving between said probe and said point a voltage having said one phase when said probe is in contact with said one area of opposite conductivity type and said other phase when said probe is in contact with said other area of opposite conductivity type, motive means responsive to said derived voltage of either of said phases for moving said probe in a respective direction to said region of one conductivity type.

2. In apparatus for the location on a surface of a body of semiconductor material of an area of one conductivity bordering on each of two sides thereof by an area of opposite type conductivity comprising a probe in sliding contact with said areas, means for applying an alternating voltage in one phase between a point of predetermined potential and one of said areas of opposite conductivity type and in another phase between said point and the other of said areas of opposite conductivity type, whereby when said probe is in contact with said one area of opposite conductivity type a voltage of said one phase is derived between said point and said probe and when said probe is in contact with said other area of opposite conductivity type a voltage of said other phase is derived between said point and said probe, motive means responsive to said derived voltage of either of phases for moving said probe in a respective direction to said one area of one type conductivity.

3. In apparatus for the location of a thin base zone of one conductivity type located between two zones of opposite conductivity type in a bar of semiconductor material, said zones meeting at P–N junctions extending inwardly from one face of said bar comprising a probe in sliding contact with said zones on said face, means for applying an alternating voltage of a predetermined frequency in one phase between a point of predetermined potential and one of said zones of opposite conductivity type and in opposite phase between said point and the other of said zones of opposite conductivity type, whereby when said probe is in contact with said one zone of opposite conductivity type a voltage of said one phase is derived between said point and said probe and when said probe is in contact with said other zone of opposite conductivity type a voltage of said opposite phase is derived between said point and said probe, motive means responsive to said derived voltage of said one phase for moving said probe in one direction toward said one zone of one conductivity type and responsive to said derived voltage of said opposite phase for moving said probe in the opposite direction toward said one area of one conductivity type.

4. In apparatus for the location on a surface of a body of semiconductor material of an area of one type conductivity bordering on each of two sides thereof by an area of opposite type conductivity comprising a probe slidably contacting said areas along a line thereon, means for applying an alternating voltage of a predetermined frequency in one phase between a point of predetermined potential and one of said areas of opposite conductivity type and in another phase between said point and the other of said areas of opposite conductivity type, whereby when said probe is in contact with said one area of opposite conductivity type a voltage of said predetermined frequency and said one phase is derived between said point and said probe and when said probe is in contact with said other area of opposite conductivity type a voltage of said predetermined frequency and said other phase is derived between said point and said probe and when said probe is in contact with said one area of said one conductivity type a voltage of another frequency is derived between said point and said probe, motive means responsive to said derived voltage of said one phase for moving said probe in one direction along said line toward said one area of one conductivity type and responsive to said derived voltage of said other phase for moving said probe in the other direction along said line toward said one area of one conductivity type and nonresponsive to voltages of other frequencies.

5. In apparatus for the location on a surface of a body of semiconductor material of an area of one type conductivity bordering on each of two sides thereof by an area of opposite type conductivity, said area meeting at P–N junctions and forming a pair of rectifying diodes having a terminal of one polarity in common, comprising a probe in sliding contact with said areas, means for applying an alternating voltage in one phase between a point of predetermined potential and one of said areas of opposite conductivity type and in another phase between said point and the other of said areas of opposite conductivity type, whereby when said probe is in contact with said one area of opposite conductivity type a voltage of said one phase is derived between said point and said probe and when said probe is in contact with said other area of opposite conductivity type a voltage of said other phase is derived between said point and said probe and when said probe is in contact with said one area of said one conductivity type a unidirectional voltage is derived between said point and said probe, motive means responsive to said derived voltage of said one phase for moving said probe toward said one area of one conductivity type and responsive to said derived voltage of said other phase for moving said probe toward said one area of one conductivity type and nonresponsive to said unidirectional voltage.

References Cited in the file of this patent

UNITED STATES PATENTS

| | | |
|---|---|---|
| 2,115,086 | Riggs | Apr. 28, 1938 |
| 2,528,054 | Harrison | Oct. 31, 1950 |